United States Patent
Bourgoin

(10) Patent No.: US 7,254,213 B2
(45) Date of Patent: Aug. 7, 2007

(54) RADIOLOGICAL IMAGERY METHOD AND DEVICE

(75) Inventor: Jacques Bourgoin, Avon (FR)

(73) Assignee: Universite Pierre et Marie Curie, Paris (FR)

( * ) Notice: Subject to any disclaimer, the term of this patent is extended or adjusted under 35 U.S.C. 154(b) by 0 days.

(21) Appl. No.: 10/494,514

(22) PCT Filed: Nov. 14, 2002

(86) PCT No.: PCT/FR02/03904

§ 371 (c)(1),
(2), (4) Date: Sep. 29, 2004

(87) PCT Pub. No.: WO03/042716

PCT Pub. Date: May 22, 2003

(65) Prior Publication Data

US 2005/0018811 A1    Jan. 27, 2005

(30) Foreign Application Priority Data

Nov. 14, 2001 (FR) .................................. 01 14741

(51) Int. Cl.
H05G 1/64 (2006.01)
(52) U.S. Cl. ..................... 378/98.8; 378/98.7
(58) Field of Classification Search ................. 378/96, 378/97, 98.7, 98.8; 250/370.09
See application file for complete search history.

(56) References Cited

U.S. PATENT DOCUMENTS

| 3,482,093 | A | * | 12/1969 | Palti .......................... 378/106 |
| --- | --- | --- | --- | --- |
| 4,021,667 | A | * | 5/1977 | Clausen et al. ................ 378/45 |
| 4,052,620 | A | * | 10/1977 | Brunnett ....................... 378/97 |
| 4,920,078 | A | * | 4/1990 | Bagley et al. ............... 438/779 |
| 5,512,756 | A | * | 4/1996 | Bayer et al. ........... 250/370.13 |
| 5,581,087 | A | * | 12/1996 | Uddin et al. ........... 250/370.11 |
| 5,729,021 | A | * | 3/1998 | Brauers et al. ........ 250/370.09 |
| 5,821,539 | A | * | 10/1998 | Matz et al. ............ 250/370.01 |
| 5,949,811 | A | * | 9/1999 | Baba et al. .................... 378/97 |
| 6,574,300 | B1 | * | 6/2003 | Florent et al. ................ 378/19 |
| 6,594,339 | B1 | * | 7/2003 | Alving et al. .............. 378/98.8 |
| 2002/0125438 | A1 | * | 9/2002 | Pyyhtia et al. ......... 250/370.08 |

OTHER PUBLICATIONS

Encyclopedia entry for Gallium Arsenide (GaAs), May 8, 2006, [online], [retrieved on May 9, 2006]. Retrieved from the Internet <URL: http://en.wikipedia.org/wiki/GaAs>.*

Owens et al., "The hard X-ray response of epitaxial GaAs detectors", Nuclear Instruments and Methods in Physics Research Section A: Accelerators, Spectrometers, Detectors and Associated Equipment, vol. 442, Issues 1-3, Mar. 11, 2000, pp. 360-363.*

(Continued)

Primary Examiner—Edward J. Glick
Assistant Examiner—Chih-Cheng Glen Kao
(74) Attorney, Agent, or Firm—Arent Fox LLP

(57) ABSTRACT

The relation relates to a method and a radiological imaging device. A subject (4) is illuminated by a luminous flux (1) generated by an X-ray source (2). This luminous flux (1) is a pulse having a duration $t_p$ shorter than 1 ms. The signals S derived from the interaction of the luminous flux (1) with the subject (4) are then detected by means of an X-ray detector (5) having a response time $t_r$ shorter than 0.1 ms.

Applications possible in medical imaging (mammography, dental care, . . . ).

4 Claims, 3 Drawing Sheets

OTHER PUBLICATIONS

Bourgoin, J.C., "A new GaAs material for X-ray imaging", Nuclear Instruments and Methods in Physics Research Section A: Accelerators, Spectrometers, Detectors and Associated Equipment, vol. 460, Issue 1, Mar. 11, 2001, pp. 159-164.*

* cited by examiner

RADIOLOGICAL IMAGERY METHOD AND DEVICE

CROSS-REFERENCE TO RELATED APPLICATION

This application is a National Stage entry of International Application No. PCT/FR02/03904, filed Nov. 14, 2002, the entire specification claims and drawings of which are incorporated herewith by reference.

BACKGROUND OF THE INVENTION

1. Field of the Invention

This invention relates to a method and a radiological imaging device.

Since its first use at the beginning of the 20$^{th}$ century, radiography has vastly transformed and simplified the diagnostic of numerous diseases. This technique is based upon the absorption, by the organ examined, of a portion of the X-rays emited by a source and the impression of the complementary X-rays having traversed the organ in question, on a screen sensitive to the latter. A negative image of the organ examined is thus obtained. Although other imaging techniques (nuclear magnetic resonance (NMR), Echography, . . . ) have appeared more recently, this conventional radiology still represents a very large number of imaging acts (diagnostic and prevention) practised currently (dental care, fractures, mammographies, pulmonary, etc . . . ). The evolution of the technologies and especially of the detectors, has increased significantly the analysis accuracy and the frequency of radiological tests. Preventive radiological tests (as for example, for the detection of breast cancers at an early step) are part of this global increase in the number of exposures to X-rays to which an individual is liable to be subjected in his lifetime.

It is therefore of paramount importance to reduce the dose of X-ray radiation received by a patient during each test, since the X-rays are mutagen agents. However, this dose of exposure is connected directly to the performances of the X-rays detectors.

2. Description of Related Art

There exist two categories of X-ray photon detectors enabling direct acquisition of the image in digital form, on top of the photographic plate. The first category implements a photosensitive layer (for instance phosphor) which transforms the X-ray photons into visible photons, which are then detected by the techniques applicable to the latter. The second category uses semi-conductive materials which transform directly the X-ray photons into electrons. The latter detectors have numerous advantages with respect to the photosensitive layers. They enable in principle the acquisition of images at faster rate and exhibit greater performances (collection or sensitivity efficiency, noise, dynamics, acquisition speed).

Currently, the only semi-conductive material having suitable electronic properties and the necessary thickness (a few 100 μm to absorb the X-photons efficiently) is CdTe. But because of the small size of the crystals available and the absence of microelectronic technology, the implementation of this material to perform X-ray imaging is not possible at industrial level.

Currently a new generation of large-area electronic detectors for medical imaging is breaking through. These make use of a scintillator, transforming the X-ray photons into visible photons, which are then detected by a matrix of photoconductive pixels performed on a layer of amorphous Si (General Electric, Canon, Trixell). Their global output is however not optimum. They only enable typical reduction by a factor 5 from the radiation dose in comparison with the photographic plate. These detectors still have an image acquisition speed which is slow (of the order of several seconds due to the response time of the scintillator).

Each pixel of a sensor integrates for a time Te (exposure time for a standard radiological test and with the current detectors, Te varies between 10 ms and a few seconds) the instant signal S generated, which is, after first approximation, proportional to the flux F of X-ray photons, to provide a response R (an electric load, for instance) proportional to the integrated signal. This response R is therefore proportional to the dose received by the patient D=F×Te where F and Te depend on the conditions of use, on the type of test practised, on the nature of the X-ray source and on the type of detector implemented. The instant signal S being low level, therefore difficult to be extracted from the noise, it should be integrated over a time Te sufficient for the response R to be processable.

BRIEF SUMMARY OF THE INVENTION

The aim of this invention is to suggest a method and a radiological measuring device simple in their design and in their operating mode, rapid and economical, enabling to reduce notably the dose D of X-ray photons received by a patient during a radiological test.

To do so, it has been noted that it is possible to process the signals supplied in response to an X-ray pulse, i.e. to a short excitation signal, of duration $t_p$ shorter than 1 ms, It is then possible to expose the subject to a flux cumulated in the time shorter than that necessary with the conventional devices fitted with slow detectors requiring a long duration excitation signal, while using possibly greater flux F. The advantages of such a method are that in integration measuring mode, the noise of the detector (black current) is integrated over a time $t_p$ shorter than Te and the signal/noise ratio is thereby increased. Finally, it enables another measuring mode of the signal, i.e. measuring the intensity of the current delivered by the detector subjected to the flux F. Excitation signal, luminous flux or X-ray are used here indifferently to designate the flux of photons to which is exposed the subject or the organ that one wishes to visualise.

To this end, the invention relates to a radiological measuring method wherein:
  the subject is illuminated with a luminous flux generated by an X-ray source,
  the signals S derived from the interaction of the luminous flux with the subject are detected by means of an X-ray detector including a set of pixels each delivering a signal,
  the signals S detected are processed digitally,
  the signals S are visualised, According to the invention:
  said signals S are detected with a fast detector having a response time $t_r$ smaller than $t_p$ and shorter than 0.1 ms,
  the subject is illuminated by a pulse having a duration $t_p$ shorter than 1 ms,
  the intensity of this pulse being suited to the sensitivity of the detector.

The relation also relates to a radiological imaging device including
  an X-ray source transmitting a luminous flux,
  control means of said source, an X-ray detector including a set of pixels detecting the signals S derived from the interaction of the luminous beam with the subject, digital processing and visualisation means of the signals S detected.

According to the invention:

the X-ray source is a pulse source generating pulses having a duration $t_p$ shorter than 1 ms;

the control means of said source enable to define the duration and the intensity of the pulse, the detector has a response time $t_r$ shorter than 0.1 ms.

In various embodiments, the present invention also relates to the following features which should be considered individually or in all their technically possible combinations:

the detector is a solid state detector, the detector is a solid-state detector with direct conversion of the photons into electrons, the detector includes an epitaxial layer of a semi-conductive material having high atomic number and a band gap ranging between 1.4 and 1.6 eV, the charge carriers (electrons) of said material having a mobility greater than 1000 $cm^2v^{-1}s^{-1}$ and a lifetime typically greater than 100 ns, said epitaxial layer non intentionally doped has a thickness d' which depends on the energy of the X-ray photons to be absorbed and which ranges between 100 μm and 1 mm.

the epitaxial layer is in GaAs, the epitaxial layer is in InP, the epitaxial layer is in CdTe, the detector is a junction p/i/n whereof the zone i is said epitaxial layer, the energy range of the photons generated by the X-ray source is comprised between 20 and 200 keV.

BRIEF DESCRIPTION OF DRAWINGS

In various possible embodiments, the invention will be described in more detail with reference to the appended drawings wherein.

DETAILED DESCRIPTION OF THE INVENTION

Figure 1:
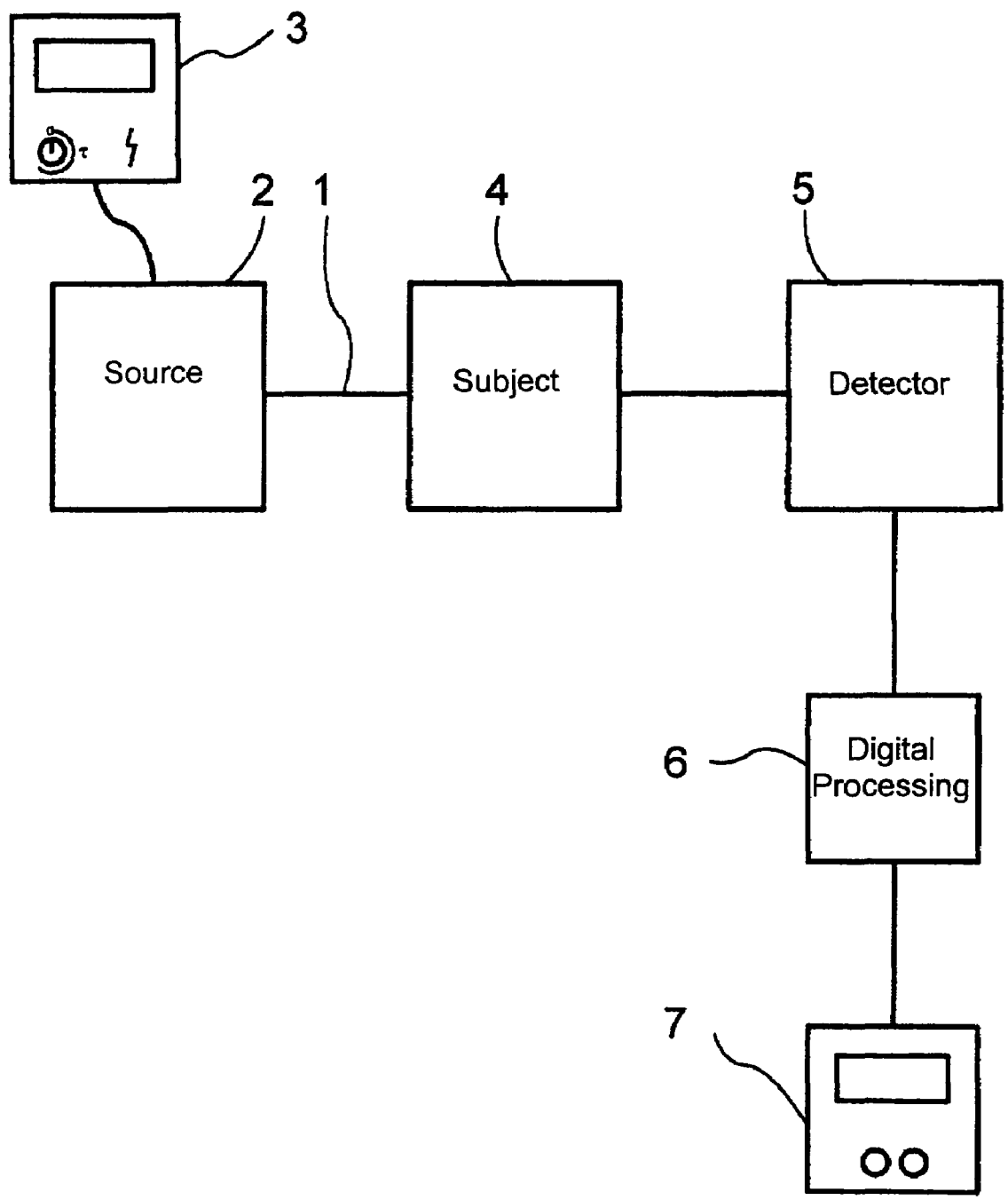
FIG. 1 represents schematically the radiological imaging device, according to the invention.

The instant signal S generated by a current detector under a flux F of X-ray photons is weak and of continuous type at a few ms-scale. This signal S is therefore difficult to extract from the background noise measured by the detector, itself continuous at this time scale. In order to obtain a response R of the detector which is significant and processable, the signal S should be integrated for an exposure time Te sufficient to imply that the patient receives, during the acquisition of this response R, the dose D=F×Te. The aim of the present invention is to replace the response R of the detector with a pulse signal. By measuring the instant signal Si for a short duration Ti before Te, with a flux of photons Fi, and in sensing said signal Si with an X-ray detector having very quick response time $t_r$, the dose may then be reduced. Indeed, one switches thus from the dose D to a dose $D_i$=Fi×Ti where Ti/Te is smaller than Fi/Fe so that Di is shorter than D. Fi may be greater than F but remains such that F×Te>Fi×Ti.

In this view, the imaging method, according to the invention, includes the following steps. The subject is illuminated by a luminous beam 1 generated by a source 2 of X-rays. This source 2 is a source transmitting a flux F of photons in an energy range variable comprised typically between 20 and 200 keV. The selection of the energy of the photons is ensured by conventional control means 3 of said source 2 of X-rays. The flux of photons 1 corresponds to a pulse having a duration $t_p$ shorter than 1 ms. The intensity of this pulse is suited to the sensitivity of the detector. The signals S derived from the interaction of the luminous flux 1 with the subject 4 are then detected by means of a detector 5 of X-rays. This detector 5 includes an array of pixels each delivering a signal. This detector 5 has very quick response time $t_r$ and shorter than typically 0.1 ms. (This response time $t_r$ of the detector 5 must be short before the duration $t_p$ of the pulse). Such a detector 5, whereof an embodiment is exhibited below, is advantageously a good photoconductor without requiring the integration of the signal. The subject 4 is illuminated and the signals S derived from the interaction of the luminous beam 1 with the subject 4 measured. The signals S detected are processed digitally to visualise the radiological image. In a preferred embodiment, we shall endeavour to minimise the dose (D=F×$t_p$) of beams received by the subject 4 during the radiological analysis.

The invention also relates to a radiological imaging device. The device includes a source 2 of X-rays emitting a luminous 1 flux F. This source 2 of X-rays includes a pulse mode operating source. Thus, the high voltage power supply of the conventional source 2 of X-rays might be replaced with a high voltage pulse generator with smaller power and the source itself will not require a rotary anode. The device also includes conventional control means 3 of said source 2. These control means 3 enable to define the duration of the pulse and its intensity. A detector 5 of X-rays enables to detect the signals S derived from the interaction of the luminous beam 1 with the subject 4. The detector 5 has a response time $t_r$ shorter than typically 0.1 ms. This detector 5 of X-rays is a solid-state detector based on a semiconductive material enabling direct conversion of the photons into electrons. In an embodiment, it includes an epitaxial layer 101 of a semi-conductive material having a thickness d' sufficient to absorb efficiently the X-ray photons. In a preferred embodiment, the thickness d' of the layer 101 depends on the energy of the X-ray photons to be absorbed and it ranges between 100 μm and 1 mm. Advantageously, the detector 5 is composed of a semi-conductive material having high atomic number and a band gap comprised between 1.4 and 1.6 eV. The free electrons in said material have a mobility greater than 1000 $cm^2v^{-1}s^{-1}$ and a lifetime greater than typically 100 ns. The semi-conductive material is then selected among one of the following materials: GaAs, InP and CdTe.

Figure 2:
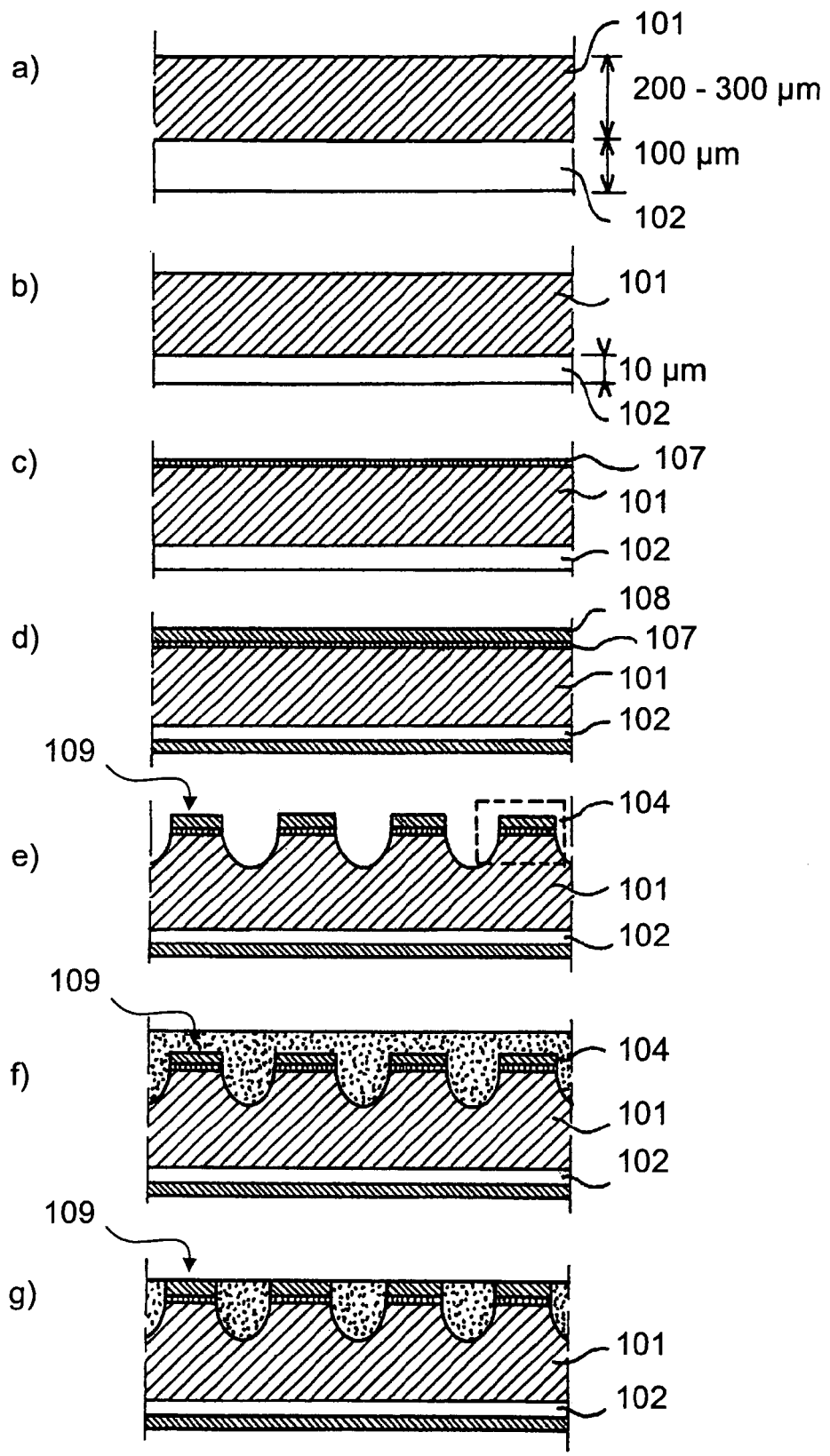
FIG. 2 is a schematic representation of the successive steps 1a), 1b), 1c), 1d), 1e), 1f) and 1g) leading to the realisation of an X-ray detector, in a particular embodiment.

According to a embodiment, this detector 5 is subject to a patent application non published, by the inventor of the present application. This patent application relates to a method and a device for the manufacture of an electronic detector 5 in GaAs for the detection of X-rays for medical imaging. According to FIG. 2, the method leading to the manufacture of X-ray detectors 5 in GaAs includes the following successive steps. The first step FIG. 2a) consists in the growth of epitaxial layers 101 of thickness d' depending on the energy of the photons to be detected on a substrate $n^+$ (or $p^+$) 102. The source material is non intentionally doped: it contains residual dopants of type p and n in concentration $10^{15}$-$10^{18}$ $cm^{-3}$ which are mainly C and Si respectively according to the literature. The material obtained also includes these impurities but in different proportions, since the transportation of impurities depends on the nature thereof. The growth of the epitaxial material 101 results from a method aiming to suppress the transportation of the gases up to the substrate 102 to obtain very rapid growth rate. To do so, a source material 103 having the same chemical composition as the material 101 to be grown (GaAs), therefore non intentionally doped and hence so-called semi-insulating, is heated to a temperature $T_r > 600°$ C. (preferably ranging between 750 and 850° C.). A reactive gas 104 ($H_2O$, in an embodiment for GaAs but which may also be used for InP and CdTe) interacts chemically with the source material 103 by creating volatile products. These volatile compounds are driven by the pressure gradient 105 up to a substrate $n^+$ (or $p^+$) 102 heated to a temperature $T_p < T_r$ (advantageously smaller by at least 50° C.). The volatile products recombine then at the surface of the substrate $n^+$ (or $p^+$) 102 to be reformed among others GaAs 106. The parallelism and the thermal insulation of the substrate $n^+$ (or $p^+$) and of the source material are thus ensured. The epitaxial layer 101 exhibits a thickness d' sufficient to absorb efficiently the X-photons.

After growing the epitaxial layer 101, the thickness of the substrate 102 is reduced by mechanical chemical polishing (step 2, FIG. 2b)). In a third step (FIG. 2c)), ions $Mg^+$ or $Be^+$, respectively $Si^+$, are implanted with energies comprised between 10 and 200 keV (advantageously around 100 keV) and typical doses (of the order of $10^{14}$ atoms/cm$^2$) to form a doping-controlled layer 107 (greater than $10^{18}$ cm$^{-3}$) of type $p^+$, respectively $n^+$ over a thickness of several hundred nm. This implantation is following by quick thermal annealing at a given temperature (approximately 850° C.) and for a short determined time (shorter than 10s). A junction $p^+/i/n^+$ has thus been manufactured. Ohmic contacts 108 (step 4, FIG. 2d)) have then been provided on both faces. This step is followed by photolithography, chemical etching or dry masking (step 5. FIG. 2e)) to form pixels 109.

These pixels 109 produced by lithography are surfaces generally of 50 to 150 μm$^2$ (for medical applications) provided on a face or lines of the same dimension on each of the faces in quadrature (FIG. 2e)). These steps are completed by a passivation of the etched surfaces (by deposition of silicon nitride, for instance (step 6, FIG. 2f)) followed by an opening onto the pixels 109 by new etching after photolithography (step 7. FIG. 2g)) in order to provide the contacts.

Figure 3:
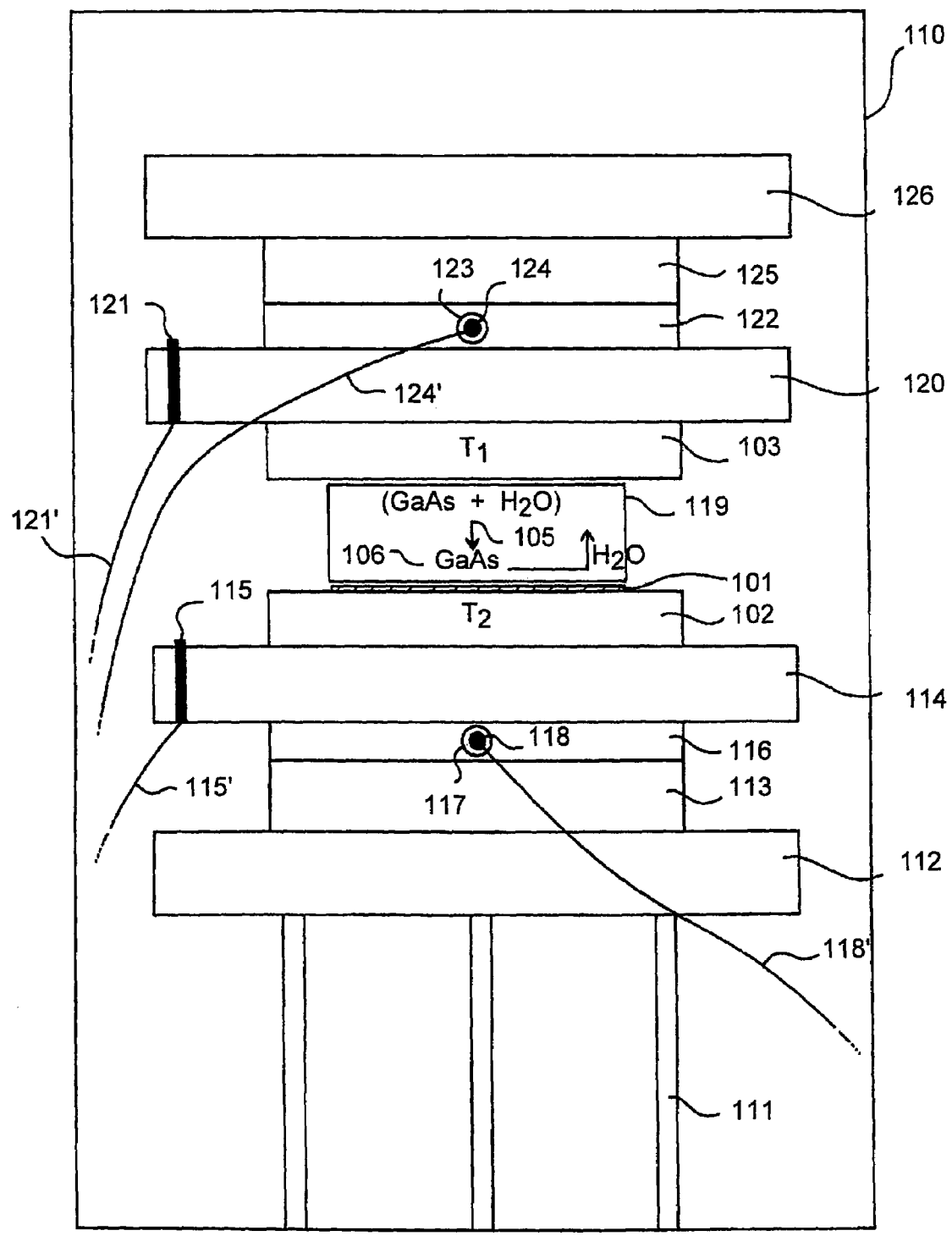
FIG. 3 is a schematic representation of the epitaxial layer growth device, in a particular embodiment.

Said patent application non published also relates to a device for producing an electronic detector 5 in GaAs for the detection of X-rays for imaging purposes. In an embodiment and according to FIG. 3, this device includes a chamber 110, wherein are arranged layer growing means. The layer growing means are carried by a tripod 111 composed of k stainless steel feet (with $k \geq 3$). This tripod 111 enables to isolate thermally the cabinet 110 from the remainder of the device. On this tripod 111, is mounted a first plate 112 acting as a base for the growing means. These growing means include a first inert plate 113 which enables thermal insulation of the base 112 from the heating means. These heating means include a first heater 114 power supplied by electric connexions 115. A first insert 116 of thickness of the order of the millimetre includes a conduit 117 for introducing temperature measuring means 118. This temperature measurement controls the temperature regulation of the device. The first heater 114 enables to heat to a temperature $T_p > 600°$ C., a substrate $n^+$ (or $p^+$) 2. On this substrate is laid a ring 119, inert under the experimental conditions described and of thickness d of the order of a few millimetres. It separates and isolates thermally the substrate $n^+$ (or $p^+$) 102 from the source material 103.

A second power supplied 121 heater 120 enables to heat the source material 103 to a temperature Tr>Tp. The differential temperature between Tr and Tp is preferably greater than 50° C. A second insert 122 of thickness of the order of the millimetre includes a conduit 123 for receiving therein temperature measuring means 124 to control and regulate the temperature of the second heater 120. The power supply and measuring cables 118', 115', 121' and 124' refer to the elements of the device carrying the corresponding number. A second plate 125 is laid on the insert 122 and serves to insulate thermally the plate 126 and the chamber 110 from the heating means. This second plate 125, by the weight exerted, also promotes uniform conditions of deposition by ensuring tight contact between the inert ring 119, the substrate $n^+$ or $p^+$ 102 and the source material 103 when heating.

The structure of an element (pixel) of the photodetector 5 described in the particular previous embodiment is a so-called p/i/n junction. In another embodiment, the structure of the photodetector 5 is a Schottky barrier. The radiological measuring device also includes electronics for reading the signals on the pixels as well as digital processing means 6 of these signals S to transform the latter into an image on display means 7. In an embodiment, these display means include a computer screen.

This method may advantageously be used for any radiological test (mammographies, dental care, . . . ). The method described should lead to significant diminution of the radiation dose X received by a subject with respect to the conventional techniques.

The invention claimed is:

1. A radiological imaging device, comprising:
    an X-ray source configured to transmit a luminous flux to a subject,
    means for controlling the source,
    an X-ray detector configured to detect a plurality of signals derived from an interaction of the luminous flux with the subject,
    means for digitally processing the plurality of signals, and
    means for viewing the plurality of signals, characterised in that:
    the X-ray source is a pulse source configured to generate pulses that have a pulse duration that is less than 1 ms and is greater than 0.1 ms,
    the means for controlling is configured to define the pulse duration of the pulses and an intensity of the pulses, and
    the X-ray detector has a response time that is less than 0.1 ms, the X-ray detector being a junction p/i/n comprising a zone p, a zone i, and a zone n, wherein the zone i is a relatively thick epitaxial layer made of an unintentionally doped semi-conductive material comprising GaAs and having a high atomic number to directly convert photons into electrons.

2. The radiological imaging device according to claim 1, wherein a thickness of the epitaxial layer depends on energy of the X-ray photons to be absorbed and which ranges between 100 μm and 1 mm.

3. The radiological measuring device according to claim 1, wherein an energy range of the photons generated by the X-ray source is between 20 and 200 keV.

4. The radiological imaging device according to claim 1, wherein the unintentionally doped semi-conductive material has a band gap ranging between 1.4 eV and 1.6 eV, an electron mobility greater than 1000 cm$^2$v$^{-1}$s$^{-1}$, and an electron lifetime greater than 100 ns.

* * * * *